(No Model.)
E. B. PRESTON.
HOSE FASTENER.
No. 282,466. Patented July 31, 1883.
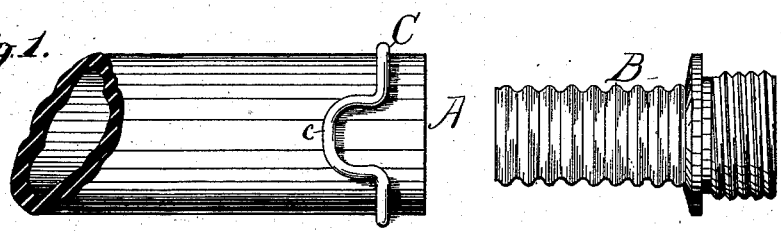
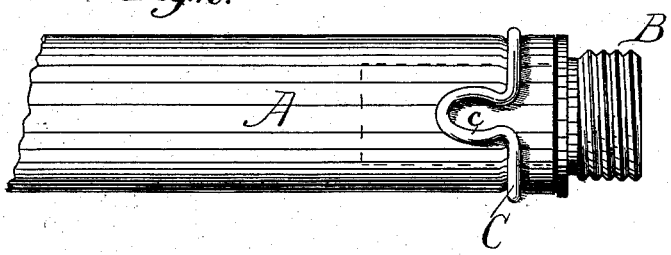
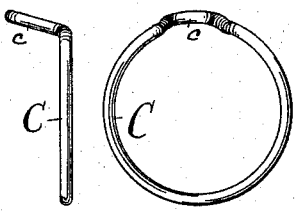 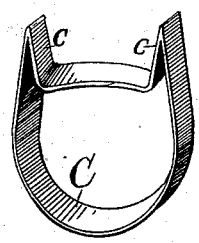 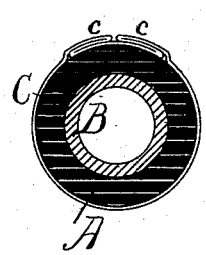
Witnesses:
T. Everett Brown
A. W. Munday
Inventor:
Everett B. Preston
per Munday, Evarts & Adcock
his Attorneys

UNITED STATES PATENT OFFICE.

EVERETT B. PRESTON, OF CHICAGO, ILLINOIS.

HOSE-FASTENER.

SPECIFICATION forming part of Letters Patent No. 282,466, dated July 31, 1883.

Application filed February 26, 1883. (No model.)

*To all whom it may concern:*

Be it known that I, EVERETT B. PRESTON, a citizen of the United States, residing in Chicago, in the county of Cook and State of Illinois, have invented a new and useful Improvement in Hose-Fasteners, of which the following is a specification.

The object of the present invention is to provide a cheap and simple device for securing sections of hose to couplings or other connections, and one which may be quickly and conveniently applied; and it consists in a compressible endless ring adapted to be slipped over the end of the hose before being united to the coupling, the size of the ring being diminished after the coupling is inserted in the hose by kinking, compressing, twisting, or collapsing some portion of the ring, so as to bind the hose and coupling firmly together and form a tight joint. To facilitate the compression of the ring I provide some portion of it with a fold, bend, offset, or projection, to which a pair of pinchers or other tool may be conveniently applied to compress the ring or diminish its size. The ring may be made of round wire, which I deem preferable, as the round wire will more readily cause the hose to sink into the corrugations on the tail-piece of the coupling; or it may be of other form—as, for example, a flat strip—and the ring may be single or double or composed of any number of coils desired. The form of the kinks or bends in the ring to facilitate its compression may of course be greatly varied without departing from the essential feature of my invention, and each ring may be provided with one or more of them, as may be desired. Though I find one ring sufficient to form a tight joint, it is obvious that any greater number may be used for each joint, if thought necessary.

In the accompanying drawings, which form a part of this specification, and in which similar letters of reference indicate like parts, Figure 1 is an elevation of a device embodying my invention, showing the ring before being compressed. Fig. 2 is a similar view of the same after being compressed. Fig. 3 is an edge view of the ring. Fig. 4 is a plan view of the ring, and Figs. 5 and 6 show a modification. The former is perspective and the latter is in cross-section.

In the drawings, A represents the hose; B, the tail-piece of the coupling, to which the hose is to be joined. C is the compressible endless ring, and $c$ is a fold, kink, offset, or projection in the ring to facilitate its compression.

In operation the ring is first slipped over the end of the hose, and then the coupling is inserted in the hose, when the fold $c$ is compressed, twisted, or collapsed—for example, as shown in Fig. 2—by means of a pair of pinchers or otherwise, so as to bind the hose tightly to the coupling and form a close joint.

As will be seen from Fig. 3, I prefer to incline the fold $c$ slightly upward, so that the pinchers may more readily take hold of the same, and after the fold is compressed it should be struck a slight blow to flatten it down upon the hose.

In Figs. 5 and 6 I have shown, for sake of illustration, one of the many modifications of which my invention is capable. In this modified form it will be seen that the fold $c$ may be readily flattened down upon the hose, as shown in Fig. 6, so as to tighten the ring upon the hose, by means of a hammer. The form first described, however, I deem to be the cheapest and simplest method of practicing my invention.

I claim—

1. The improved hose-fastener consisting of a compressible endless ring adapted to be slipped over the end of the hose before the coupling is inserted in the hose, and afterward compressed, so as to form a tight joint, substantially as specified.

2. The hose-fastener consisting of the compressible endless ring C, provided with a fold or projection, $c$, to facilitate its compression, substantially as specified.

3. The combination of the hose, the coupling, and the compressible endless ring for securing the same together, substantially as specified.

EVERETT B. PRESTON.

Witnesses:
H. M. MUNDAY,
CHAS. B. STEACY.